United States Patent [11] 3,607,860

[72] Inventors Yukiomi Yamato
 Kawanishi-shi;
 Hitoshi Taniguchi, Osaka-shi; Sadao
 Nakayama, Osaka-fu; Teisaburo Tateishi,
 Osaka-fu, all of Japan
[21] Appl. No. 686,338
[22] Filed Nov. 28, 1967
[45] Patented Sept. 21, 1971
[73] Assignee Fuji Oil Company Limited
 Osaka-shi, Japan
[32] Priority Dec. 1, 1966
[33] Japan
[31] 41/78819

[54] PROCESS FOR THE PRODUCTION OF SOY PROTEINS HAVING GEL FORMING ABILITY
7 Claims, No Drawings

[52] U.S. Cl. .................................................... 260/123.5, 99/17
[51] Int. Cl. ..................................................... A23l 1/20
[50] Field of Search .......................................... 99/17, 14; 260/112, 123.5

[56] References Cited
UNITED STATES PATENTS
3,001,875 9/1961 Sair .............................. 99/17

Primary Examiner—A. Louis Monacell
Assistant Examiner—William Andrew Simons
Attorney—Woodhams, Blanchard and Flynn ABSTRACT: A soy protein having excellent water-solubility, gel-forming ability, water-binding property and emulsifying property is obtained by separating the protein at a temperature below 80° C. in an acidic condition from soy milk which is obtained from soybean meal or soybeans by water extraction, alkalizing the protein with an alkalizing agent, returning the pH to about neutral with acid and thereafter heating the resulting protein solution at a temperature above 60° C.

PROCESS FOR THE PRODUCTION OF SOY PROTEINS HAVING GEL FORMING ABILITY

BACKGROUND OF THE INVENTION

This invention relates to a process for the production of a water-soluble protein having excellent gel-forming ability, water-binding ability and emulsifying property, which comprises separating the protein by acidifying soy milk which is obtained from soybean meal or soybeans by water extraction, alkalizing the protein, returning the pH to about neutral and thereafter heating the resulting protein solution. Products excellent in gel strength and visco-elasticity, and good in water-binding ability and emulsifying property can be obtained when the soy protein is utilized in meat processing and other fool processing.

DESCRIPTION OF THE PRIOR ART

It has been conventional to make soy proteins by processing soybean meal directly, or by concentrating or isolating the proteins so that they can be utilized in food processing, such as in meat processing or unkneaded marine product processing. However, since the soy proteins are globular proteins, improvements in the quality of the processed product are restricted spontaneously in the above method because the soy proteins resist transformation of their physical state. The products of the above methods have many of the following disadvantages: weakness in gel strength even though they may have some gel-forming ability; lack of gel strength and visco-elasticity which has detrimental effects on the extensibility and chewyness when the products are used to make kneaded marine products and hams or sausages; and inferiority in emulsifying property and water-binding property. On the other hand, fibrous soy proteins which are obtained by spinning the soy proteins, making use of their coagulating properties, have been studied. However, only products which are not completely satisfactory as a food have been obtained. These products are not only lacking in smoothness but also inferior in water-binding and emulsifying properties. By using these methods, only products having insufficient emulsifying property, water-binding property, and especially gel-forming ability are obtained. Particularly it was impossible to obtain a soy protein product having such properties and a high water-solubility. It is earnestly desired to provide a soy protein which has a great water-binding property and a strong gel-forming ability, and which also is capable of emulsifying fats which are added in great amounts in processed meat products.

SUMMARY OF THE INVENTION

The animal proteins are fibrous and form net frameworks by intertwining with one another in processing. Since most of these proteins are soluble in saline solutions, they can form strong frameworks. Thereby it is considered that the soluble protein becomes insoluble and affords strong gels by heating. The inventors have noted the above facts and have discovered the present invention as a result of investigations of the relationships of maintaining the solubility of globular soy proteins and fiber forming of protein molecules with changes of pH as well as with heating.

Thus, the present invention comprises separating the protein at a temperature below 80° C. in an acidic condition from soy milk which is obtained from soybean meal or soybeans by water extraction, alkalizing said protein, returning the pH to about neutral, i.e., weakly alkaline, neutral or weakly acidic, and thereafter heating the resulting protein solution, whereby the emulsifying property, water-binding ability and gel-forming ability of said protein are increased with maintenance of the soluble state.

In the present invention, soy milk is first prepared by extracting protein with water using soybean meal or soybeans as a starting material. In order to obtain a final product having as high a water-solubility as possible, and to obtain a high yield in the water extraction, it is preferable to employ soybean meal or soybeans having a high water-soluble protein content. It is necessary to carry out the extraction at a pH above six for the purpose of increasing the extraction effect. The extraction may be carried out at a low temperature or at a high temperature, such as at 100° C. When an alkalizing agent or sulfite is added to increase the bleaching effect and the protein extraction effect, it is economical to employ a high temperature. An alkalizing agent, such as sodium hydroxide, potassium hydroxide, sodium carbonate or sodium bicarbonate is generally used; and a sulfite such as sodium sulfite or sodium bisulfite is generally used.

The soy milk is then acidified with an acid to precipitate and separate the protein. In this case, the protein is separated in a curd state. In general, the pH of the protein separating step is suitably from 3.5 to 5.0 and is preferably from 4.2 to 4.5. The acid used in acidifying the soy milk is preferably an edible organic acid or an inorganic acid. An organic acid, such as acetic acid or lactic acid, or an inorganic acid, such as hydrochloric acid, phosphoric acid or sulfuric acid, is usually used. This operation is carried out at a temperature suitably below 80° C. and preferably below 70° C. to recover the solubility of the protein by the following operation. If the temperature is above 80° C., the water-solubility of the protein is difficult to recover by the subsequent treatment, and fibrous structure forming of the protein molecules is difficult to perform.

The precipitated and separated protein is then alkalized by an alkalizing treatment. The alkalizing treatment is conducted by adding an alkalizing agent. The alkalizing agent used in this case is as same as that used in the above-water extraction step. In the alkalizing step, the pH is suitably from 9 to 12 and is, in particular, preferably from 9 to 11. If the pH is below 9, the visco-elasticity may become insufficient, and if the pH is above 12, a browning reaction of the protein may become prominent, the salt concentration of the final product may be increased, and then the protein may be hydrolyzed, thereby decreasing its viscosity. The protein regains its water-soluble state and at the same time a fibrous structure forming of protein molecules may occur partially. As a result the protein obtains a water-binding property and a gel-forming ability. It is considered that the globular protein is converted to the fibrous protein by stirring and the time elapsed, since a part of the soy protein is cleaved and the globular protein is loosened in this case.

The protein is then approximately neutralized. Alkalinity is unfavorable in food, and it gives many unfavorable disadvantages in taste and on storage, such as rapid putrefaction and bad color. Particularly in the present invention, the protein tends to become brown if it remains in an alkaline condition during the subsequent heating step. Accordingly, it is necessary to neutralize the protein for the sake of the next step. The pH of the neutralizing step is suitably from 5 to 8 and preferably between 6 and 7. Thus, approximate neutralization refers to making the protein weakly acid, neutral or weakly alkaline. The neutralization is carried out by the use of an acid. In this case, the acid used is usually, an edible acid as described hereinbefore.

If the protein, separated by acidification from soy milk as described above, is immediately neutralized and dried and no alkalization step is carried out, the protein may have an insufficient water-binding property and, at most, a hygroscopicity rate of 150 percent. In case the 150 percent hydrated or hygroscopic product is heated to thermally denaturate and coagulate the protein, a product with weak gel strength and inferior visco-elasticity may be obtained. Consequently, as described above, the successive steps of acidification, alkalization (to pH9–12) approximate neutralization including weak acidity and weak alkalinity, are extremely important characteristics of the present invention. Furthermore, it is necessary not to raise the temperature as much as possible during the steps, each having a different pH after the isolation of the protein.

It seems economical that the protein may be extracted by the use of an alkali from soybean meal or soybean meal leached in an aqueous acid solution. In case a strong alkali is used during the extraction, the protein molecules may be hydrolyzed and in that event a decrease of the viscosity of the aqueous protein solution occurs. Therefore, this extraction process has a fatal defect of remarkably decreasing the visco-elasticity in the heat coagulation of the protein. On the other hand, according to the process of the present invention, the protein is not hydrolized but becomes linear so that it is provided with visco-elasticity, provided that the pH of the isolated protein is regulated between 9 and 12. Thus, in order to obtain the effects of the present invention, it is necessary that the protein, which is obtained as an aqueous solution by the water extraction of soybean meal or soybeans, is precipitated at its isoelectric point in order to increase the concentration of the protein and then the pH is regulated between 9 and 12. If other steps are employed in regulating the pH of the isolated protein, the effect in combination with the subsequent heating step cannot be obtained.

In the present invention, the aqueous solution, of the protein, approximately neutralized as described hereinbefore, is then denaturated by heating. It is necessary to conduct the heating at a temperature above 60° C., but immoderate heating, as described in detail hereinafter, should be prevented. The heating may be carried out either by blowing steam directly on the protein solution, or by heating indirectly, for a short period of time. The soy protein, which has become fibrous by the treatment of changing the pH, is further assisted in this direction by the heating step. The water-binding property which already existed may be increased and at the same time the gel-forming ability may be strengthened. Undoubtedly, it is necessary to maintain the previously obtained solubility. If heating is conducted at a temperature below 60° C., a long time is required for obtaining the desired properties and consequently the gel-forming ability may be decreased. However, immoderate heating should be avoided even when the temperature is above 60° C. Heating can be carried out at a temperature in the range of from 60° C. to 150° C., and it should be at a temperature at which the nitrogen solubility index (N.S.I.) of the resulting spray-dried protein powder, having a 10 percent water content, is above 40.

$$N.S.I. = \frac{\text{Weight of water soluble protein}}{\text{Weight of the total protein}} \times 100$$

The solubility is apt to be reduced, and the water-binding property and the gel-forming ability may be decreased by effecting immoderate heating. If the protein liquor, produced by only adjusting the pH without conducting the final thermal denaturation, is dried, a product having very weak gel-forming ability is obtained, and the effect according to the process of the present invention cannot be obtained. The effect of the present invention is achieved only in the case that a series of operations as described above is accompanied by the heating step, and therefore said heating step is extremely important in the present invention.

The effect of the present invention is shown in the following table:

| Alkali treatment (NaOH) pH | Thermal denaturation after neutralization | | 4-Fold test Thickness 3 mm. |
|---|---|---|---|
| | Temp. °C. | Time min. | Characteristic of Product |
| 7.0 | 100 | 2 | A |
| 8.0 | 60 | 70 | C |
| 8.0 | 80 | 20 | B |
| 8.0 | 100 | 2 | A |
| 9.0 | 60 | 70 | A-AA |
| 9.0 | 80 | 20 | AA |
| 9.0 | 100 | 2 | AA |
| 10.0 | 100 | 2 | AA |
| 11.0 | 100 | 2 | AA |
| 12.0 | 100 | 2 | B-A |
| 10 | None | None | D |

INSTRUCTIONS FOR 4-FOLD TEST

1. Mix homogeneously in a cutter
200 gr. of said protein product
600 gr. of water
90 gr. of fat
15 gr. of common salt
2. Deforming
3. Stuffing into tube
4. Packing
5. Heating at 90° C. for 40 minutes
6. Cooling in tap water
7. Slicing into sheets of 3 mm. in thickness
8. The strips are then folded in half and then are folded in half once more The results obtained by the 4-fold test are shown in the table

IDENTIFICATION OF SYMBOLS

Sheets which rents are formed by folding in two    B
Sheets in which rents are formed by folding in four    A
Sheets in which no rents are formed by folding in four    AA
Sheets which are of lower quality than B    C
Sheets which have little forming ability    D The water-binding property can be further improved according to the present invention. That is, the water-binding property, which in in the range between 200 percent and 220 percent before the heating step, is elevated to the range between 300 percent to 330 percent after the heating and drying treatment. At the same time, the gel-forming ability can be improved. When an aqueous solution containing 13 percent by weight of the protein and 2.5 percent by weight of NaCl, is prepared and heated at 80° C. for 30 minutes, gelation occurs. The gel is apt to easily form rents if it is not heated, whereas if it is heated the gel may have a strong self-supporting ability and visco-elasticity by which rents are difficult to produce. Generally, the gel-forming ability may be decreased when soy protein is mixed with fats in producing sausages. However, the protein according to the present invention exhibits a visco-elasticity from AA grade to A grade even though it may contain, for example, from 10 percent to 15 percent of fats and 2.5 percent salt(NaCl). Ordinary soy proteins or proteins obtained without conducting the final heating process exhibit visco-elasticities merely from C grade to D grade. Furthermore, the emulsifying property is also promoted. For example, the emulsion formed by adding 5 percent of the protein produced by the process of the present invention to a mixture of water and fats or oil at the weight ratio of 1;1 does not separate and can still maintain its consistency even when it is heated at a temperature above 100° C.

In the present invention, the aqueous solution, of the soy protein, obtained by conducting thermal denaturation, can be dried, if required, by heating so that it can be preserved well and so that it will be convenient to transport. Any methods generally used for this purpose are utilizable, but spray drying is preferable. An emulsion great in stiffness is obtained when the soy protein so obtained is emulsified with water and fats and oil or fatty meat. The protein is utilized as it is or as an emulsion in food processing and kneaded marine product and meat processing, and in the production of ordinary sweets and foods.

The soy protein obtained according to the present invention is soluble in water and has an excellent water-binding property, emulsifying property and gel-forming ability. It affords many excellent characteristic products having so-called visco-elasticity when it is employed in food processing and kneaded marine and meat product processing.

DESCRIPTION OF THE PREFERRED EMBODIMENTS

The following examples are presented further to illustrate the present invention. It is not intended, however, that the invention be limited to the details of the embodiments described therein.

Example 1

One hundred kg. of water and, at the same time, 20 g. of sodium sulfite were added to 10 kg. of soybean meal having a nitrogen solubility index (N.S.T.) of 85 and soybeans having a N.S.I. of 92. Thereafter the extraction was conducted at ordinary temperature. 250–300 ml. of concentrated hydrochloric acid was then added to the obtained soy milk, and the pH was adjusted to between 4.2 and 4.6. The precipitated protein thus obtained was separated by centrifuging and then was suspending in water. The suspension was then neutralized with sodium hydroxide, and the pH was adjusted to between 10 and 11 while it was stirred vigorously to homogenize the liquor. After being thus alkalized, the alkaline liquor was again neutralized with hydrochloric acid to a pH between 6 and 7. The temperature of the neutralized liquor was raised to 100° C. either by blowing with steam or by indirect heating and thereafter the liquor was dried by spray drying.

The qualities of the protein powder thus obtained were as follows:

Water content of the product   4.68 percent
Crude protein   86.3 percent
N.S.T.   84.8
pH (in 1 percent aqueous solution)   7.25
Ash   5.93 percent Gel-forming ability: The gel which was formed by molding a 2.5 percent common salt(NaCl) aqueous solution containing 12 percent by weight of the protein powder product prepared as described above, based on the entire weight of the solution and heating the molded material at 80° C. for 30 minutes, had a self-supporting ability. A self-supporting gel was not formed when a soy protein product produced by the conventional techniques was used in the same way. The gel-forming ability is generally decreased when the solution contains salt but, nevertheless, an excellent gel-forming ability can be obtained in accordance with the process of the present invention. An emulsion of great stiffness was obtained when 200 g. of the protein powder obtained as described above, 1 kg. of fatty pork, 50 g. of common salt and 1 kg. of water were mixed and emulsified in a cutter at a temperature of from 40° C. to 50° C. for about 10 minutes. This emulsion on heating at 110° C. for 30 minutes gave an emulsion of high consistency which did not separate. In the utilization of the emulsion of great stiffness as described above in meat processing, sausages rich in fat and stable in emulsification can be obtained.

Example 2

Two hundred kg. of water and 20 g. of sodium sulfite were added to 10 kg. of soybean meal having a N.S.I. of 88 and the mixture was heated at 100° C. to extract soy milk from which the residue was separated. After cooling to 40° C., an acid was added to the soy milk, and the pH was adjusted to pH 4.5 to precipitate the protein. The same treatments as described in example 1 were followed.

The qualities of the powdered soy protein thus obtained were as follows:

Water content of the product   4.25 percent
Crude protein   86.45 percent
N.S.I.   70.5
pH   7.05
Ash   5.73 percent The gel-forming ability was excellent and was similar to that of the product obtained in example 1.

Other pigments and spices were added to a mixture of 1 kg. of the powdered soy protein obtained as described above, 3 kg. of water, 450 g. of lard and 10 g. of common salt. After being mixed and emulsified homogeneously in a cutter, the mixture was cased and heated on a water bath in such a manner that the central part was heated at 80° C. for 30 minutes. An oil-emulsified gel having elasticity and a homogeneous phase was thus obtained, which could be used in producing sausage-like foods.

We claim:

1. In a process for producing a water-soluble soy protein which comprises the steps of obtaining soy mild from soybean meal or soybeans by water extraction at a pH above 6, precipitating and separating the soy mild at a temperature below 80° C. in an acidic condition to obtain protein and then treating the protein to improve the gel-forming ability thereof, the improvement in said treating step which comprises adding an alkalizing agent to said protein to adjust the pH of the protein to be in the range of 9 to 12, then adding an acidifying agent to the protein to approximately neutralize the protein, and thereafter heating the resultant approximately neutral protein solution to a temperature in the range of from 60° C. to 150° C. to denature the protein whereby to obtain a water-soluble soy protein having an improved gel-forming ability, as well as a water-binding ability and an emulsifying property.

2. A process according to claim 1, wherein at least one compound selected from the group consisting of alkalizing agents and sulfite is added in the step of extracting the soy milk with water.

3. A process according to claim 1, wherein the pH is adjusted to between 4.2 and 4.5 in the precipitation and separation of said protein in acidic condition.

4. A process according to claim 1, wherein the pH is adjusted to between 9 and 11 in the adjustment of the pH of said protein with an alkalizing agent.

5. A process according to claim 1, wherein the heating step is conducted at a temperature in the range of from 80° C. to 120° C.

6. A process according to claim 1 in which, after the heating step, the protein solution is spray dried.

7. A process according to claim 1 in which, in the treating step, the protein is suspended in water, then the alkalizing agent is added thereto to adjust the pH of the suspension to be in the range of 10 to 11 while stirring the suspension to homogenize same and then adding the acidifying agent to adjust the pH to be in the range of 6 to 7.